(12) United States Patent
Wang et al.

(10) Patent No.: US 10,668,411 B2
(45) Date of Patent: Jun. 2, 2020

(54) DEPTH FILTRATION MEDIA WITH MULTIPLE ORGANIC AND/OR INORGANIC MATERIALS

(71) Applicant: Entegris, Inc., Billerica, MA (US)

(72) Inventors: Henry Wang, Hsinchu (TW); Dean Tsou, Hsinchu (TW); Yi Wei Lu, Hsinchu (TW); Bob Shie, Hsinchu (TW)

(73) Assignee: Entegris, Inc., Billerica, MA (US)

( * ) Notice: Subject to any disclaimer, the term of this patent is extended or adjusted under 35 U.S.C. 154(b) by 0 days.

(21) Appl. No.: 15/652,842

(22) Filed: Jul. 18, 2017

(65) Prior Publication Data

US 2018/0221793 A1  Aug. 9, 2018

Related U.S. Application Data

(60) Provisional application No. 62/364,619, filed on Jul. 20, 2016.

(51) Int. Cl.

| | | |
|---|---|---|
| *B01D 29/21* | (2006.01) |
| *B01D 29/11* | (2006.01) |
| *B01D 39/20* | (2006.01) |
| *B01D 27/07* | (2006.01) |
| *B01D 39/16* | (2006.01) |
| *B01D 69/10* | (2006.01) |
| *B01D 71/04* | (2006.01) |

(Continued)

(52) U.S. Cl.
CPC ......... *B01D 29/216* (2013.01); *B01D 27/07* (2013.01); *B01D 29/111* (2013.01); *B01D 39/1623* (2013.01); *B01D 39/2017* (2013.01); *B01D 39/2086* (2013.01); *B01D 69/10* (2013.01); *B01D 69/12* (2013.01); *B01D 71/04* (2013.01); *B01D 71/26* (2013.01); *B01D 71/52* (2013.01); *B01D 71/68* (2013.01); *B01D 2201/182* (2013.01); *B01D 2239/025* (2013.01); *B01D 2239/0622* (2013.01); *B01D 2239/0668* (2013.01); *B01D 2239/1216* (2013.01); *B01D 2239/1233* (2013.01); *B01D 2311/04* (2013.01); *B01D 2311/2649* (2013.01); *B01D 2325/02* (2013.01)

(58) Field of Classification Search
None
See application file for complete search history.

(56) References Cited

U.S. PATENT DOCUMENTS

| | | | | |
|---|---|---|---|---|
| 4,366,054 A | * | 12/1982 | Kronsbein | B01D 39/16 210/266 |
| 5,591,335 A | * | 1/1997 | Barboza | B01D 29/111 210/323.2 |
| 6,260,709 B1 | | 7/2001 | Leman | |

(Continued)

FOREIGN PATENT DOCUMENTS

| | | |
|---|---|---|
| CN | 101952210 | 1/2011 |
| CN | 102858439 | 1/2013 |

(Continued)

*Primary Examiner* — Ana M Fortuna
(74) *Attorney, Agent, or Firm* — Entegris, Inc.

(57) ABSTRACT

A method of making depth filtration media, such as for use in a depth filter, are described. The resulting depth filtration media includes a core tube having two or more different layers. The layers can be fibers, such as polymeric or inorganic fibers, wrapped layers of a filter material, or pleated and folded layers of a filter material.

20 Claims, 2 Drawing Sheets

(51) Int. Cl.
  *B01D 71/68* (2006.01)
  *B01D 71/26* (2006.01)
  *B01D 69/12* (2006.01)
  *B01D 71/52* (2006.01)

(56) References Cited

U.S. PATENT DOCUMENTS

| | | | |
|---|---|---|---|
| 7,153,425 B2 | 12/2006 | Stankowski | |
| 7,247,245 B1 | 7/2007 | Proulx et al. | |
| 2003/0057147 A1* | 3/2003 | Sutcliffe | A61M 1/0209 210/437 |
| 2005/0205489 A1* | 9/2005 | Siwak | B01D 15/125 210/500.21 |
| 2009/0078658 A1* | 3/2009 | Meddock | B01D 29/216 210/767 |
| 2012/0125834 A1* | 5/2012 | Gessner | B01D 29/117 210/411 |
| 2013/0306562 A1* | 11/2013 | Stifter | B01D 29/21 210/652 |
| 2015/0258479 A1* | 9/2015 | Gruber | B01D 46/00 55/486 |
| 2015/0329263 A1 | 11/2015 | Wong | |
| 2016/0023898 A1* | 1/2016 | Morgenstern | B01J 8/067 48/61 |
| 2016/0082375 A1* | 3/2016 | Tinkham | B32B 5/26 210/493.5 |
| 2017/0173509 A1* | 6/2017 | Giglia | B01D 39/1623 |

FOREIGN PATENT DOCUMENTS

| | | |
|---|---|---|
| CN | 102922796 | 2/2013 |
| CN | 103619435 | 3/2014 |
| CN | 104994928 | 10/2015 |
| KR | 20120027266 A | 3/2012 |
| KR | 20150054047 A | 5/2015 |

* cited by examiner

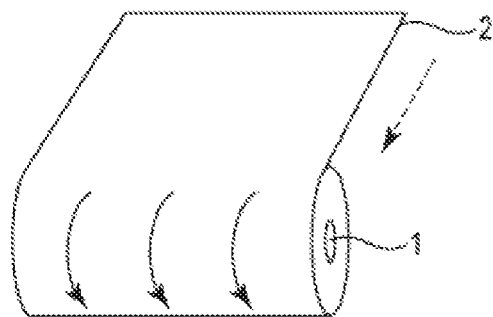
FIG. 1A
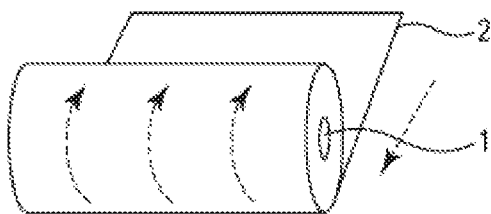
FIG. 1D
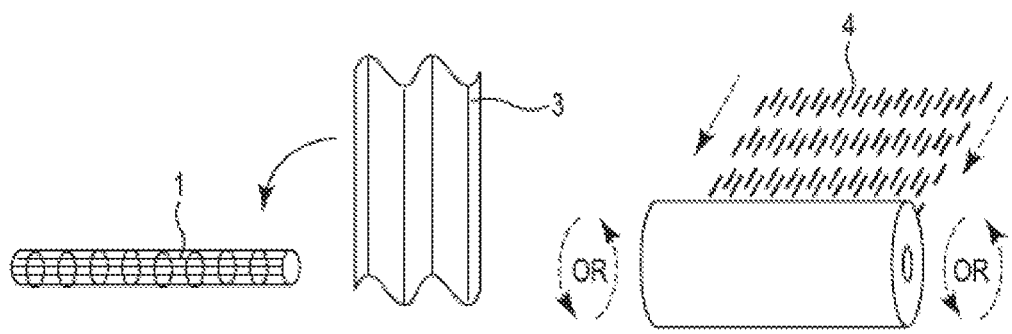
FIG. 1B
FIG. 1C

DEPTH FILTRATION MEDIA WITH MULTIPLE ORGANIC AND/OR INORGANIC MATERIALS

RELATED APPLICATIONS

The benefit of priority under 35 U.S. C. § 119 of U.S. Provisional Patent Application No. 62/364,619, filed 20 Jul. 2016, is hereby claimed. The disclosure of U.S. Provisional Patent Application No. 62/364,619 is incorporated herein by reference, in its entirety, for all purposes.

FIELD

The disclosure relates to depth filtration media that includes multiple layers of different materials that can be in different configurations, such as flat or pleated sheets, and that can be used for controlling the size distribution of particles in slurry compositions.

BACKGROUND

Chemical Mechanical Planarization (CMP) is an important process in semiconductor manufacturing. During a CMP process, a chemical reagent containing polishing liquid and a polishing pad remove material from a semiconductor wafer surface in order to planarize the wafer. The polishing liquid usually includes a solution mixed with grinding slurry particles in colloidal phase or materials in a dispersed phase. The grinding slurry particles are extremely hard, and typically have a diameter of about 10-200 nm. The polishing liquid and slurry is filtered before being used to polish a wafer in order to protect the wafer from being scratched by impurities in the slurry.

Depth filters utilize a porous filtration medium to retain particles throughout the medium, rather than on the surface of the filter medium. Depth filters are used in a variety of industrial filtration processes, such as for removing hard particles and gels from a CMP slurry. Typically, depth filters are formed from polypropylene (PP).

SUMMARY

Described herein are depth filtration media, methods of making depth filtration media, and depth filters incorporating the depth filtration media. The depth filtration media described herein are formed of two or more different materials. Compared to depth filtration media formed of only a single material, the depth filtration media described herein can provide a number of benefits, including high flow rate and improved particle retention. When the depth filtration media is used to filter a slurry for CMP applications, the filtered slurry can have a more narrow particle size distribution, which ultimately leads to decreased polishing defects.

Embodiments of the disclosure include a multilayer depth filtration media comprising a non-woven layer of polymeric melt-blown fibers. The melt-blown fibers have a diameter that can range from about 0.3 micron to about 10 microns and these melt-blown fibers form a layer atop a liquid permeable core. These melt-blown fibers atop the core form a layer that has a thickness between about 1 millimeter and about 20 millimeters. Overlying or atop the non-woven layer of polymeric melt-blown fibers is a non-woven microporous filter membrane, the filter membrane has pores with a size of between about 0.2 microns and about 1.4 microns and the thickness of the filter membrane can be between about 20 microns and about 1000 microns. A non-woven layer of polymeric melt-blown fibers is layered atop the non-woven microporous filter membrane, the polymeric melt-blown fibers in this layer can have a diameter that can range from about 0.3 micron to about 10 microns. These melt-blown fibers overlying the non-woven microporous filter membrane form a layer that has a thickness between about 1 millimeter and about 20 millimeters. The non-woven microporous filter membrane can be wrapped around the underlying melt-blown fibers and core as a flat sheet. The non-woven microporous filter membrane can be a pleated membrane that is positioned around the underlying melt-blown fibers and core.

The multilayer depth filtration media in embodiments of the disclosure includes those wherein the non-woven filter membrane is made from a material chosen from the group consisting of glass, quartz, polysulfone, polyether sulfone, polyaryl sulfone, nylon, polyamide, fluoropolymers, and polytetrafluoroethylene.

In some embodiments of the multilayer depth filtration media the non-woven filter membrane material is chosen from the group consisting of glass, polyether sulfone, and nylon.

Another embodiment of the disclosure is a depth filtration media having a plurality of layers, comprising: a core tube; a layer of a first filter material over the core tube; and a layer of a second filter material over the layer of first filter material, the first and second filter materials being different. In some embodiments, the depth filtration media can have a third filter material over the layer of second filter material. The one or more of the layers of the depth filtration media can be wrapped, pleated, or melt-blown.

One embodiment of the disclosure is a method of making depth filtration media having a plurality of layers. The method includes the acts or steps of providing a liquid permeable core; layering a first filter material over the core; and layering a second filter material over the first material, the first and second filter materials being different and form a depth filtration media. The method can further comprise layering a third filter material over the second filter material.

The method in various embodiments include those wherein layering any combination of the first, second, or the third layer is performed by melt-blowing.

The method in various embodiments include those wherein layering any combination of the first, second, or the third layer comprise using a pleated microporous membrane.

The method of making a filter in embodiments of the disclosure include those wherein the pleated filter material is a composite filter material.

The method of making a filter in embodiments of the disclosure include those wherein layering the first, second, or optionally the third layer is performed by wrapping a filter material about the core or an underlying layer.

The method of making a filter in embodiments of the disclosure include those wherein the first filter material is polypropylene that is layered by melt-blowing.

The method of making a filter in various embodiments of the disclosure include those wherein the second filter material is polyamide, polyether sulfone, or glass fibers that is layered by wrapping atop the first layer.

The method of making a filter in various embodiments that includes layering a third filter material, wherein the third material is polypropylene that is layered by melt-blowing.

The method of making a filter in various embodiments of the disclosure wherein one or more of the first, second, and third filter materials are polyethylene, polypropylene, cellulose, acetate, polyesters, polyamides, polytetrafluoroethylene, fluoropolymers, quartz fibers, or glass fibers.

Another version of the disclosure is a depth filter, comprising filtration media comprising a core tube, a layer of first filter material over the core tube, and a layer of second filter material over the layer of first filter material, the first and second filter materials being different; end caps bonded to opposing ends of the filtration media and a housing having an inlet and an outlet; and O-rings securing the filtration media to the housing.

Incorporating two or more different materials in a depth filtration media can yield a depth filtration media that filters by both sieving and non-sieving mechanisms. In a depth filtration media formed of different materials, the different materials can capture particles by different mechanisms.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating various features of the embodiments.

FIG. 1A is a schematic illustrating wrapping a filter material or composite filter material on a core, FIG. 1B illustrates a pleated membrane that can be placed on a core, FIG. 1C illustrates a melt-blowing manufacturing process for making depth filtration media on a core, and FIG. 1D is a schematic illustrating wrapping a filter material or composite filter material on a core.

DETAILED DESCRIPTION

Figure 2:
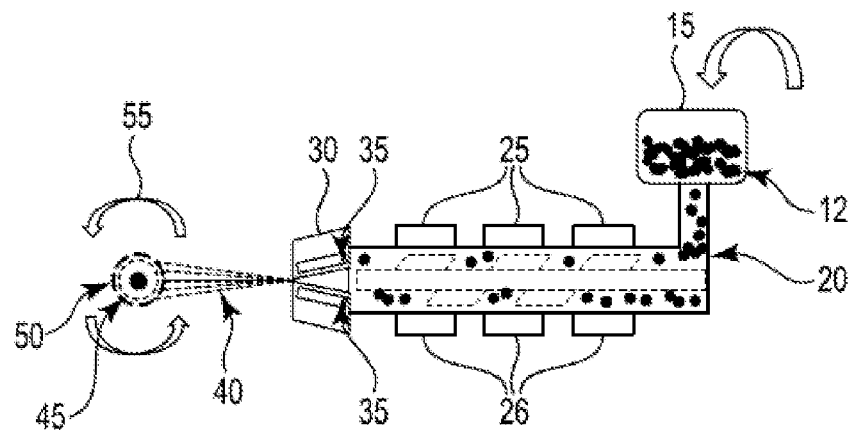
FIG. 2 is a schematic illustrating a nanofiber melt-blowing process.

A description of example embodiments follows.

Depth Filtration Media

Depth filtration media are formed by layering two or more different materials to create a depth filtration media having multiple layers. At least two of the layers are formed of different materials. In some instance, each layer is formed of a different type of material. Incorporating two or more different materials in a depth filtration media can yield a depth filtration media that filters by both sieving and non-sieving mechanisms.

As used herein, "filter material" refers to the different types of materials from which filters are formed, including a membrane, a non-woven, a film, melt-blown fibers and a nanofiber melt-blown media.

As used herein, "sieving filter material" refers to a filter material that captures particles or is optimized to capture particles primarily via a sieving retention mechanism. Exemplary sieving filter materials are made from, for example, polypropylene (PP) and polyethersulfone (PES).

As used herein, "sieving retention mechanism" refers to retention that is the result of the particles being larger than the pores in a filter or microporous filter material. Sieving retention can be enhanced by formation of a filter cake (an agglomeration of particles at the surface of the filter or filter material), which effectively acts as a secondary filter.

As used herein, "non-sieving filter material" refers to a filter material that captures particles or is optimized to capture particles primarily via non-sieving retention mechanisms. In the filtration of gels, which are often negatively charged, a nylon filter material acts as a non-sieving filter material. Exemplary non-sieving filter materials are made from, for example, polyethersulfone (PES), polyimide (PI), polytetrafluoroethylene (PTFE), glass fibers, and NYLON, such as NYLON-6 or NYLON-6,6.

As used herein, "non-sieving retention mechanism" refers to retention that occurs by mechanisms, such as interception, diffusion and adsorption that are not related to the pressure drop or bubble point of the filter or microporous filter material.

A core supports the layers and permits fluid flow in order to enable filtration by the resulting filtration media. The core is permeable to liquids and gases and the core allows a flow of these fluids to pass through the core from an outer surface to an inner surface. When the core is constructed of a solid piece of plastic, fluid can flow through discrete holes in the core. Alternatively, the core can be a tubular, non-woven material that provide sufficient structural support and porosity for fluid flow. The core can be plastic, but other materials are suitable as well. The core can have the shape of a cylinder or tube, although other shapes such as elliptical, rectangular, or triangular cores can be used as well.

Filter materials can be layered over the core tube by a variety of different techniques, such as melt-blowing, wrapping, and fanning a pleating filter material around the core tube. FIG. 1 is a schematic illustrating layering processes. Panels FIG. 1A and FIG. 1D show wrapping and collection of a filter material 2 onto core tube 1. As illustrated, wrapping can be performed in a clockwise or counterclockwise direction. Panel FIG. 1B illustrates layering a pleated filter material 3 on core tube 1. Panel FIG. 1C illustrates melt-blowing fibers 4 onto core tube 1. As illustrated, the core tube can be rotated in a clockwise or counter-clockwise direction during the melt-blowing procedure. The melt-blown fibers 4, which can be nanofibers, allow the slurry working particles, such as $AlO_2$ or ceria, to pass through the filter media while intercepting larger particles and agglomerates.

FIG. 2 is a schematic illustrating a melt-blowing process that can be used to create nanofibers. First, raw resin 12 is inserted into a tank 15. The raw resin travels through a pipe and into an extruder 20, where it is melted by heating plates 25, 26, while a screwing motion extrudes and mixes the melted resin. The resin exits the screwing portion of the extruder and enters a die 30. Hot air 35 also enters into the die and draws out the melted resin as fibers, preferably nano-sized fibers (e.g., <1 μm). As the melted resin is drawn through a small opening in the die by the hot air 35, it is rapidly cooled by the surrounding air to form melt-blow or nanofibers, which are collected on a rotating core tube 45. Rotation 55 of the core tube 45 distributes melt-blown fibers across the core tube 45 until a desired thickness is reached. Where the fibers are nanofibers, the fibers collected on the core tube are described as a nano melt-blown media (NMB) 50. The resin is extruded through the die until the nanofiber melt-blown media reaches a specified outer diameter.

In some embodiments of the disclosure, the melt-blown polymeric resin fibers can have a diameter of between about 0.3 micron or about 300 nanometers to about 10 microns or 10,000 nanometers. These melt-blown resin fibers can be used for example as a layer atop of the core, as a layer atop of the microporous membrane layer, or various combinations of these.

The diameter of the melt-blown fibers can be varied throughout the depth filtration media. In one embodiment for example, the melt-blown fibers overlying the core can have a different average diameter from those overlying the filter membrane layer. The melt-blown fibers in any layer can have essential the same average diameter or have a gradient of fiber diameters either increasing or decreasing in size moving in the direction of the core. In one embodiment the melt-blown fibers can include micron-sized melt-blown polymeric resin fibers greater than 1 micron on the core (act as protection layers), a layer of nanometer diameter-sized melt-blown polymeric resin fibers less than 1 micron in diameter overlying the micron sized melt-blown resin fibers, and then a layer of micron-size melt-blown polymeric resin fibers greater than 1 micron in diameter over the nanometer diameter-sized fibers (protection layer for underlying microporous membrane).

The pore size of the melt-blown polymer resin fiber layer can be between about 0.01 microns and about 0.5 microns, and in some embodiments from about 0.05 microns and about 0.5 microns.

Embodiments of the disclosure can include a layer multilayer depth filtration media comprising a non-woven layer microporous filter membrane as one or more layers. In some embodiments the microporous filter membrane has pores with a size of between about 0.2 microns and about 1.4 microns and the thickness of the filter membrane can be between about 20 microns and about 1000 microns.

Wrapping filter material is illustrated in FIG. 1A and FIG. 1D. In some instances, a rolled filter material 2 can be directly layered onto a core tube 1. Alternatively, a rolled filter material 2 can be layered over another layer, such as a layer of first material that has been melt-blown onto a core tube. In some instances, a composite filter material can be wrapped onto a core tube. As used herein, a composite filter material is formed from two or more constituent filter materials. For example, a composite filter material can be formed by contacting two or more filter materials together to form a composite filter material. Composites of varying numbers of constituent filter materials can be made, such as composite filter materials of two, three, four, five or more filter materials. In some cases, the filter materials are layered on top of each other. In some cases, the composite filter material is a pre-formed composite filter material (e.g., a composite filter material has already been formed and is provided, such as on a roll). Typically, at least two filter materials of the composite are different materials. The composite filter material can then be wrapped onto a core tube to form a filtration media having two or more layers. When wrapping, the tension of the filter material roll and the rotation speed can be controlled to optimize the wrapping process. In some instances, a compression roller can be used to push the filter material layers close together. The filter material can be wrapped in either a clockwise or counter-clockwise direction, and the choice of direction is not expected to materially impact the performance characteristics of the filtration media.

Forming a pleated layer is illustrated in FIG. 1B. Pleating increases the surface area of a filter material available for filtration, and methods of forming pleated filter materials are known in the art. Briefly, a flat sheet filter material 3 is folded to form a "pleat pack," which is then connected in a cylindrical manner around the core tube. Alternatively, the pleat pack can be spread into a cylindrical arrangement, and then the core tube can be inserted into the middle. In some instances, the filter material that is pleated can be a composite filter material, such as the composite filter materials described in the preceding paragraph.

A variety of materials are suitable for incorporation into the depth filtration media, including organic and inorganic materials. Suitable organic materials include polyethylene, polypropylene, cellulose, acetate, polyesters, polyamides (NYLON), polytetrafluoroethylene (PTFE), and fluoropolymers. Suitable inorganic materials include glass fibers, such as LYPORE 9390 and LYPORE 9355 glass filtration media (available from Lydall Performance Materials), or quartz wool fibers.

The following embodiments describe particular sequences of layering materials to form a depth filtration media. However, it is important to note that the depth filtration media can be formed by adding layers in a variety of different sequences and by a variety of different processes (wrapping, pleating, melt-blowing).

In a first embodiment, a layer of first material is melt-blown onto a core tube. Then, a layer of second material, which is different than the first material, is wrapped or folded over the layer of first material. Then, a layer of third material is wrapped, either in a clockwise or counterclockwise direction, over the layer of second material. Then, a layer of fourth material is melt-blown over the layer of third material.

In a second embodiment, a layer of first material is folded onto a core tube. Then, a layer of second material, which is different than the first material, is wrapped, either in a clockwise or counterclockwise direction, over the first layer. Then, a layer of third material is wrapped or folded over the layer of second material. Then, a layer of fourth material is melt-blown over the third layer.

In a third embodiment, a layer of first material is wrapped, either in a clockwise or counterclockwise direction, onto a core tube. Then, a layer of second material, which is different than the first material, is melt-blown over the first layer. Then, a layer of third material is wrapped or folded over the layer of second material.

Figure 3A:
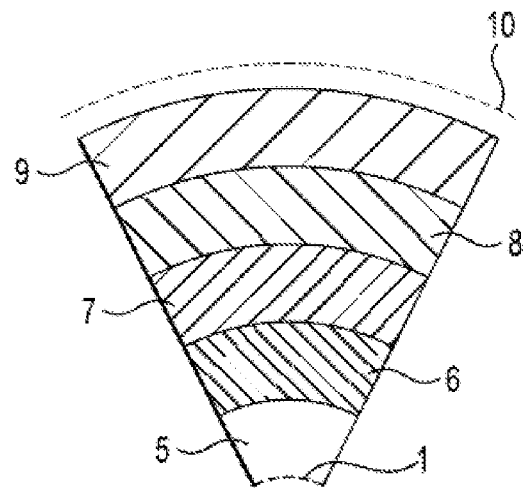
FIGS. 3A-B are schematics illustrating partial cross-sections of filtration media with multiple material layers.
Figure 3B:
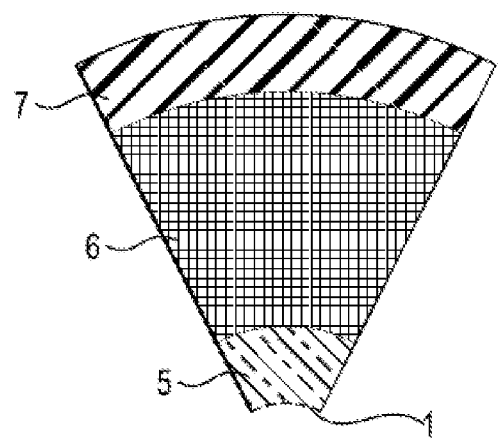

FIG. 3A is a schematic illustrating a partial cross-section of filtration media with multiple layers of materials and a core. The filtration media is generally tubular in shape, and at the center is a core tube 1. Additional layers 5, 6, 7, 8, and 9 can surround the core tube 1 and are formed by the wrapping, pleating, and melt-blowing processes described herein. A cage 10 can be used to additionally support the underlying layers 5, 6, 7, 8, and 9. FIG. 3B is a schematic illustrating a partial cross-section of a filtration media with multiple layers of material.

In one embodiment, FIG. 3B illustrates a layer of first material 5 that can be melt-blown onto the core tube 1. Then, a layer of second material, 6, which is different than the layer of first material 5, is wrapped or folded over the layer of first material 5. Then, a layer of third material 7 is wrapped, either in a clockwise or counterclockwise direction, over the layer of second material 6.

As illustrated in FIGS. 3A and 3B, the different layers can have differing thicknesses. While the filtration media can be made to any overall thickness, typically outer diameter of the filtration media is standardized so that pre-formed end caps can be bonded onto the filtration media. For example, the core tube can have a standard outer diameter of about 30 mm, and the filtration media can have an outer diameter of about 66 mm. Thus, the overall combined thickness of the layers is about 36 mm. As one example, a first layer can have a thickness of about 20 mm, a second layer can have a thickness of about 1 mm, and a third layer can have a thickness of about 15 mm. In this example, the first (inner)

layer can be about 20 mm of nonwoven polypropylene, the second layer can be about 1 mm of nonwoven fiberglass, and the third (outer) layer can be about 15 mm of nonwoven polypropylene.

The types of different layers and the thicknesses of the different layers can be adjusted in order to maximize performance of the filtration media. The filtration media described herein can have a wide variety in terms of the number of layers, such as 2, 3, 4, 5 or more layers. Each of the layers can have varying thicknesses.

Depth Filters

A depth filter can be formed from the depth filtration media described herein. Depth filters are known in the art, such as those described in U.S. Pat. No. 7,247,245. Typically, the depth filtration media are used in cartridge filters and disposable filters. In both types of filters, the filtration media is typically cut to an appropriate length, which may be a standardized length. For a cartridge-style filter, end caps are bonded to both ends of the cut filtration media, which is then inserted into a housing having an inlet and an outlet port. O-rings are typically fastened at either end to ensure that the housing is sealed. For a disposable filter, the filtration media is bonded to a plastic housing, and the entire housing can be discarded after use. Typically, O-rings are not needed for disposable filters because the filtration media is bonded with the housing.

In some instances, a cage 10 as illustrated in FIG. 3A, can be bonded together with the end caps and filtration media to provide additional structural support to underlying media layers such as 9, 8, 7, 6, and 5 in FIG. 3A. The cage 10 is typically a tubular plastic supporting structure, though other materials can be used as well. Like the core 1, fluid readily flows through the cage 10, such as through large holes in the cage 10, so that the cage 10 does not restrict the flow of fluid to the filtration media. A cage 10 may be used when the filter material is formed by pleating because the exterior of the filter material is flexible, and the cage 10 provides improved structural integrity.

In some instances, the depth filter can include a plurality of annular spacers that segment the depth filter. The spacers can reduce the compressibility of the filtration material due to the pressure from the feed fluid during use.

In some embodiments, a depth filter can comprise one or a plurality of different layers of filtration material, and each layer can have the same or different particle retention size. Typically, larger pore size layers are positioned closer to the inlet, and smaller pore size layers are positioned closer to the outlet. The retention size of the filtration material can be varied by varying the diameter of the fibers used to form the filtration material or by varying the winding the fibers tighter or looser around the core tube. In some embodiments, the depth filter can be formed by stacking a plurality of sheets within a housing.

EXEMPLIFICATION

Depth filtration media were formed as indicated in Table 1. As an example, Hybrid Filter Media A was made by forming a first layer on a core tube. For this embodiment, the first layer is non-woven polypropylene (PP) that is melt-blown onto the core tube. The core tube has an outer diameter of 34 mm. Then, a second layer, which is non-woven NYLON having a pore size of 1.4 µm is wrapped over the first layer. Then, a third layer, which is non-woven polypropylene, is melt-blown over the second layer.

The depth filtration media was tested by measuring the retention of 0.1% ceria abrasives (Zenus HC60(2-), Solvay, Japan) in deionized (DI) water. A 0.1% wt. % ceria abrasives solution was prepared using deionized water as a solvent. The ceria abrasives solution was flowed through the filter being tested. The total volume flowed through the filter was approximately 3 liters over a duration of approximately 12 minutes, yielding a flow rate of approximately 250 cc/min. The average diameter of the ceria particles was approximately 150 nm. The large particle counts (LPC) of the particle channel >0.84 µm (e.g., measuring particles larger than 0.84 µm) was monitored using PSS AccuSizer FX-Nano instrument. The after filtration sample counts was slightly less than the before filtration counts. The difference yielded a ceria particle retention of 61% for the >0.84 um particle channel for the traditional filter media.

The depth filtration media was also tested by measuring water pressure drop at a flow rate of 10 L/min for a 10" media cartridge. The measured pressure drop for Hybrid Filter Media A was 1.70 kg/cm$^2$.

TABLE 1

| Filter Media Sample Type | Material(s) | 0.1% Ceria Retention (at particle channel >0.84 µm) | 10" Pressure Drop for deionized water at 25° C. at a flow rate of 10 L/min |
|---|---|---|---|
| Traditional Filter Media | Polypropylene (PP) Non-woven | 61% | 0.79 kg/cm$^2$ |
| Filter Media A | 1. PP Non-woven<br>2. Polyamide (NYLON) non-woven 1.4 µm<br>3. PP Non-woven | 93% | 1.70 kg/cm$^2$ |
| Filter Media B | 1. PP Non-woven<br>2. Polyether sulfone (PES) non-woven 1.2 µm<br>3. PP Non-woven | 91% | 1.90 kg/cm$^2$ |
| Filter Media C | 1. PP Non-woven<br>2. Polyether sulfone (PES) non-woven 0.8 µm<br>3. PP Non-woven | 98% | 2.10 kg/cm$^2$ |

TABLE 1-continued

| Filter Media Sample Type | Material(s) | 0.1% Ceria Retention (at particle channel >0.84 μm) | 10" Pressure Drop for deionized water at 25° C. at a flow rate of 10 L/min |
|---|---|---|---|
| Filter Media D | 1. PP Non-woven<br>2. LYPORE 9390 glass non-woven 0.5 μm (Lydall Performance Materials)<br>3. PP Non-woven | 100% | 1.64 kg/cm² |
| Filter Media E | 1. PP Non-woven<br>2. LYPORE 9355 glass non-woven 0.2 μm (Lydall Performance Materials)<br>3. PP Non-woven | 100% | 2.00 kg/cm² |

Table 1 lists the results of testing depth filtration media made by the processes described herein. For the Traditional Type Filter Media, the filter media has several melt-blown layers. For Hybrid Filter Media A-E, the filtration material was formed by melt-blowing the first material onto a core tube, wrapping the second material over the first material, and melt-blowing the third material over the second material. All filters described in Table 1 were made using a core tube having an inside diameter of 28.5 mm and an outside diameter of 34 mm. The final outside diameter of the filter media was 67 mm.

Notably, Filter Media A-E provide improved retention of the about 0.1% ceria particles compared to Traditional Filter Media that is made from only one material. Although the Filter Media A-E have a larger pressure drop, the pressure drop is still acceptable. Moreover, it is possible to utilize multiple filters in parallel in order to provide a higher flow rate.

INCORPORATION BY REFERENCE AND EQUIVALENTS

Although various embodiments have been shown and described with respect to one or more implementations, equivalent alterations and modifications will occur to others skilled in the art based upon a reading and understanding of this specification and the annexed drawings. The embodiments includes all such modifications and alterations and is limited only by the scope of the following claims. In addition, while a particular feature or aspect of an embodiment may have been disclosed with respect to only one of several implementations, such feature or aspect may be combined with one or more other features or aspects of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising." Also, the term "exemplary" is merely meant to mean an example, rather than the best. It is also to be appreciated that features and/or elements depicted herein are illustrated with particular dimensions and/or orientations relative to one another for purposes of simplicity and ease of understanding, and that the actual dimensions and/or orientations may differ substantially from that illustrated herein.

Although the various embodiments have been described in considerable detail with reference to certain versions thereof, other versions are possible. Therefore the spirit and scope of the appended claims should not be limited to the description and the versions contained within this specification. The teachings of all patents, published applications and references cited herein are incorporated by reference in their entirety except for express definitions.

What is claimed is:

1. A depth filtration media having a plurality of layers, comprising:
   a) a core tube;
   b) a non-woven layer of a first filter material comprising polymeric fibers melt-blown atop the core tube, wherein a diameter of the polymeric fibers is in a range from about 0.3 micron to about 10 microns; and
   c) a layer of a second filter material over the layer of first filter material, the first and second filter materials being different.

2. The depth filtration media of claim 1, further comprising:
   d) a layer of a third filter material over the layer of second filter material.

3. The depth filtration media of claim 2, wherein one or more of the second layer or the third layer is wrapped, pleated, or melt-blown.

4. A multilayer depth filtration media comprising:
   a) a non-woven layer of polymeric melt-blown fibers, the polymeric melt-blown fibers have a diameter that range from about 0.3 micron to about 10 microns, the polymeric melt-blown fibers form a layer atop a liquid permeable core, the layer has a thickness between about 1 millimeter and about 20 millimeters;
   b) a non-woven microporous filter membrane overlying the melt-blown polymeric fibers atop the core, the microporous filter membrane has pores with a size of between about 0.2 microns and about 1.4 microns and the thickness of the filter membrane can be between about 20 microns and about 1000 microns; and
   c) a non-woven layer of polymeric fibers melt-blown atop the non-woven microporous filter membrane, the polymeric fibers in this layer atop the microporous filter membrane have a diameter of from about 0.3 micron to about 10 microns, said layer has a thickness between about 1 millimeter and about 20 millimeters.

5. The depth filtration media of claim 4 wherein the non-woven filter membrane material is chosen from the group consisting of a glass, a polyether sulfone, nylon.

6. The depth filtration media of claim 4 wherein one wrapped layer is a pleated membrane.

7. A depth filter, comprising:
   a) the depth filtration media of claim 4; and
   b) end caps bonded to opposing ends of the depth filtration media.

8. A method of making depth filtration media having a plurality of layers, comprising:
   a) providing a core tube;
   b) melt-blowing a first filter material comprising polymeric fibers atop the core tube, wherein a diameter of the polymeric fibers is in a range from about 0.3 micron to about 10 microns; and
   c) layering a second filter material over the first filter material, the first and second filter materials being different;
thereby forming a depth filtration media.

9. The method of claim 8, further comprising layering a third filter material over the second filter material.

10. The method of claim 9, wherein layering the second or the third layer is performed by melt-blowing.

11. The method of claim 9, wherein layering the second or the third layer is performed by layering a pleated filter material.

12. The method of claim 11, wherein the pleated filter material is a composite filter material.

13. The method of claim 9, wherein layering the second or the third layer is performed by wrapping a filter material.

14. The method of claim 13, wherein the filter material is a composite filter material.

15. The method of claim 8, wherein the first filter material is polypropylene that is layered by melt-blowing.

16. The method of claim 15, wherein the second filter material is polyamide, polyether sulfone, or glass fibers that is layered by wrapping.

17. The method of claim 16, further comprising layering a third filter material, wherein the third material is polypropylene that is layered by melt-blowing.

18. The method of claim 8, further comprising cutting the depth filtration media.

19. The method of claim 8, wherein one or more of the first, second, and third filter materials are polyethylene, polypropylene, cellulose, acetate, polyesters, polyamides, polytetrafluoroethylene, fluoropolymers, or glass fibers.

20. A depth filter, comprising:
   a) filtration media comprising a core tube, a non-woven layer of first filter material comprising polymeric fibers melt-blown atop the core tube, wherein a diameter of the polymeric fibers is in a range from about 0.3 micron to about 10 microns, and a layer of second filter material over the layer of first filter material, the first and second filter materials being different; and
   b) end caps bonded to opposing ends of the filtration media.

* * * * *